Figures 7, 8:
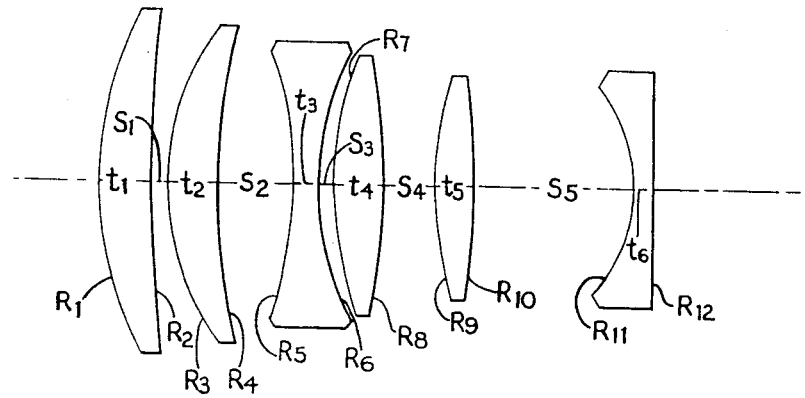

Feb. 26, 1952 W. SCHADE 2,586,866
HIGH APERTURE FIVE-COMPONENT OBJECTIVE
Filed Aug. 11, 1950 3 Sheets-Sheet 1
Fig. 1
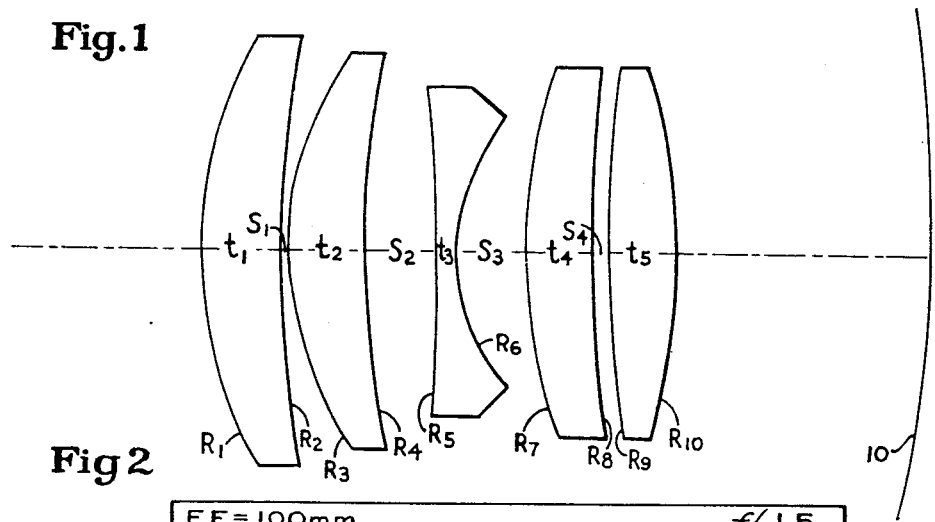
Fig 2
| EF=100mm | | | | f/1.5 |
|---|---|---|---|---|
| Lens | N | V | Radii | Thicknesses |
| 1 | 1.611 | 58.8 | $R_1$=+70.63mm | $t_1$=12.41mm |
| | | | $R_2$=+274.27 | $S_1$= .61 |
| 2 | 1.611 | 58.8 | $R_3$=+50.44 | $t_2$=11.50 |
| | | | $R_4$=+121.14 | $S_2$=11.45 |
| 3 | 1.720 | 29.3 | $R_5$=−484.94 | $t_3$= 3.75 |
| | | | $R_6$=+37.90 | $S_3$=10.90 |
| 4 | 1.611 | 58.8 | $R_7$=+80.09 | $t_4$=11.50 |
| | | | $R_8$=+237.61 | $S_4$= 1.92 |
| 5 | 1.611 | 58.8 | $R_9$=+160.74 | $t_5$=11.50 |
| | | | $R_{10}$=−86.17 | BF= 59.1 |
Fig 3
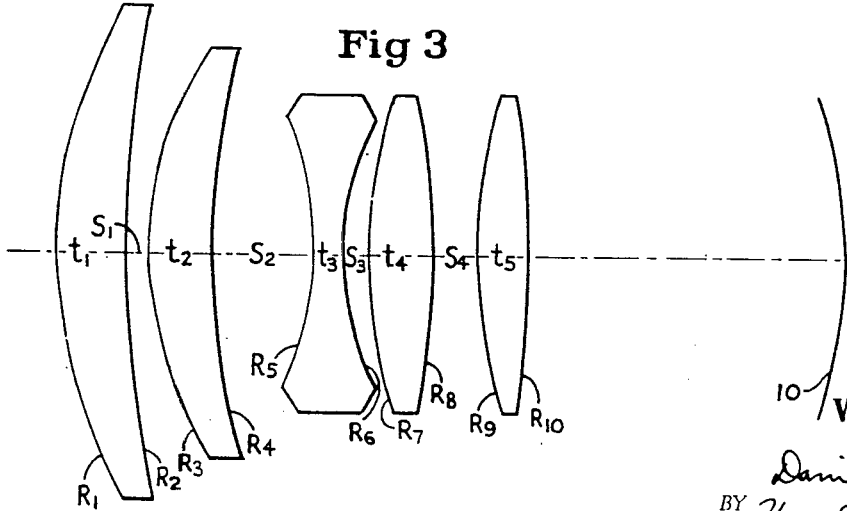
Willy Schade
INVENTOR
Daniel J. Mayne
BY Harold F. Bennett
ATT'Y & AGT.

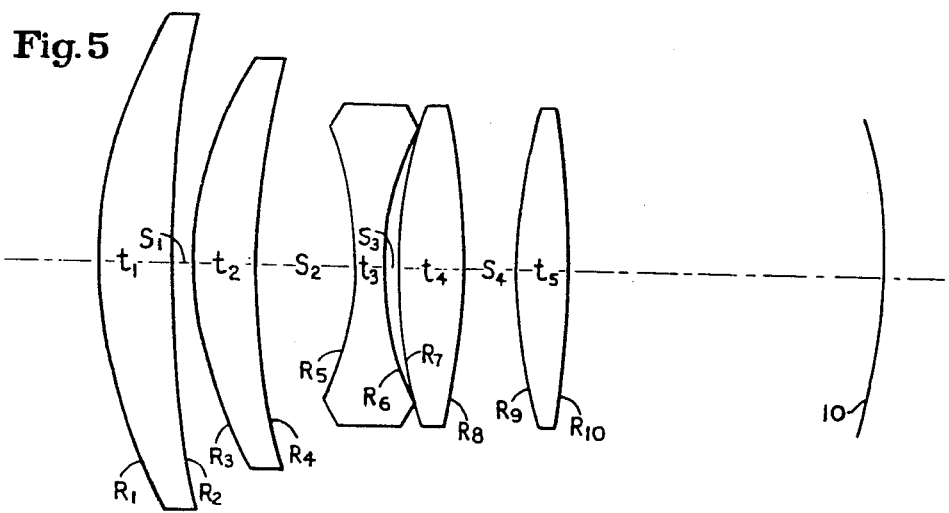

| EF = 100mm | | | | f/1.1 |
|---|---|---|---|---|
| Lens | N | V | Radii | Thicknesses |
| 1 | 1.611 | 58.8 | $R_1$= +110.62mm | $T_1$ = 15.09mm |
|   |       |      | $R_2$= +436.64   | $S_1$ = 4.51 |
| 2 | 1.611 | 58.8 | $R_3$= +78.98    | $T_2$ = 15.09 |
|   |       |      | $R_4$= +194.82   | $S_2$ = 21.24 |
| 3 | 1.720 | 29.3 | $R_5$= -140.39   | $T_3$ = 7.51 |
|   |       |      | $R_6$= +84.21    | $S_3$ = 5.24 |
| 4 | 1.611 | 58.8 | $R_7$= +105.10   | $T_4$ = 14.43 |
|   |       |      | $R_8$= -164.57   | $S_4$ = 14.43 |
| 5 | 1.611 | 58.8 | $R_9$= +108.85   | $T_5$ = 11.81 |
|   |       |      | $R_{10}$= -269.31 | $S_5$ = 46.56 |
| 6 | 1.517 | 64.5 | $R_{11}$= -47.50 | $T_6$ = 5.63 |
|   |       |      | $R_{12}$= ∞      | |

Willy Schade
INVENTOR

Patented Feb. 26, 1952

2,586,866

UNITED STATES PATENT OFFICE 2,586,866

HIGH APERTURE FIVE-COMPONENT OBJECTIVE

Willy Schade, Rochester, N. Y., assignor to Eastman Kodak Company, Rochester, N. Y., a corporation of New Jersey Application August 11, 1950, Serial No. 178,835

3 Claims. (Cl. 88—57)

This invention relates to optical objectives and particularly to objectives which are designed especially for the projection of the image on a cathode ray tube on to a larger screen.

The object of the invention is to provide an objective which is relatively simple in construction and suitable for mass production at a moderate cost and which has a very large aperture for providing high illumination of the projected image with a sufficiently high degree of correction of the lens aberrations so that the image on the cathode ray tube is projected without loss of detail.

It has long been known that it is possible to simplify the construction of an optical objective without loss of detail in the image if the image is allowed to focus on a curved surface concave toward the objective. This is because objectives naturally have a positive Petzval sum and a curvature of image concave toward the objective, and in the usual objective, part of the structure is used to flatten this field. In the practice of photography, it is usually not convenient to give the sensitive film the curved shape necessary for use with this kind of objective, but in photographing or projecting images from fluorescent screens such as those in cathode ray tubes, this difficulty has not been found serious. Accordingly, the lens designer can concentrate on producing a sharp image with a simplified lens structure and the cathode ray tube face is then curved to fit the curvature of the image formed by the optical system.

An important consideration in television projection is the need for a high degree of illumination to give the projected image satisfactory brightness. This high illumination can only be gained by having a large relative aperture in the optical system. For this reason the Schmidt reflecting system has been used in television projection, but reflecting systems have the drawback of being awkward and bulky, and it is difficult to make the large reflecting surface with the requisite degree of accuracy. Projection lenses as heretofore known, on the other hand, have too small an aperture for sufficient illumination or too complex a structure for inexpensive production.

According to the present invention, an optical objective particularly suitable for television projection is made up of five simple air-spaced lens elements of which the front two and the rear two are positive and the center one is negative. By the front is meant the side facing the longer conjugate, which in this case is the projected image. The front surface of the front element is more strongly curved than the rear surface thereof and hence is necessarily convex. The second element is meniscus in shape with its convex surface to the front. I have found it advantageous to give this last-mentioned convex surface a radius of curvature between $0.4\ F$ and $F$, and to give each of the two front elements a focal length between $1.25\ F$ and $3.5\ F$ where $F$ is the focal length of the objective. The middle element is biconcave and has its more strongly curved surface to the rear. In order to correct the color, the dispersive index or V-value of the material of which this element is made should be between 0.4 and 0.6 times the average of the dispersive indices of the four positive elements. I have found it advantageous to give this negative element a focal length between $-0.4\ F$ and $-0.8\ F$. I have found the shape of the fourth element to be less critical than the shapes of the front two elements. However, I find it advantageous to have the front surface of this element convex with a radius of curvature between $0.5\ F$ and $2\ F$ and to have the focal length of this element between $0.8\ F$ and $2.5\ F$. The rear element is advantageously biconvex and has a focal length between $0.65\ F$ and $1.65\ F$.

These five elements are mounted in axial alignment separated by four air spaces, of which the second is the largest. This type of construction results in a relatively short objective, which gives the advantage of good illumination near the edges of the picture area. The over-all length of the objective from the front surface of the front element to the rear surface of the rear element is between $0.7\ F$ and $1.3\ F$. All five elements may be made of commercially available glasses, or if desired, the negative element can be made of potassium bromide crystal which has known advantages in correcting secondary color. The refractive indices of all the optical materials used are conveniently between 1.56 and 1.80.

I have found that a Petzval sum between 0.006 and 0.009 is advantageous in obtaining a good correction of astigmatism on a curved image field. These values of Petzval sum are given for a focal length of 100. This Petzval sum is conveniently obtained by making the algebraic sum of the powers of the eight surfaces of the four positive elements between 2.5 and 3.1 times the power of the whole objective.

Objectives of this type can advantageously be combined with a negative element immediately in front of the image surface for flattening the field, as is commonly done with Petzval type objectives.

In the accompanying drawings:

Figs. 1, 3, 5 and 7 show objectives according to the invention, and

Figs. 2, 4, 6 and 8 give constructional data for typical examples thereof.

In all the examples shown, the front two elements are meniscus in shape. The front element, however, is nearly plane on its rear face and may be made plane or slightly convex if desired.

Figs. 1 and 2 show an objective designed to cover an angular field of ±20° and to work at a magnification of five times. The data for this example is given as Example 1 below.

Example 1.—Figures 1 and 2

[EF=100 mm.   f/1.5]

| Lens | N | V | Radii, mm. | Thicknesses, mm. |
|---|---|---|---|---|
| 1 | 1.611 | 58.8 | $R_1$=+ 70.63 | $t_1$=12.41 |
|   |       |      | $R_2$=+274.27 | $s_1$= 0.61 |
| 2 | 1.611 | 58.8 | $R_3$=+ 50.44 | $t_2$=11.50 |
|   |       |      | $R_4$=+121.14 | $s_2$=11.45 |
| 3 | 1.720 | 29.3 | $R_5$=−484.94 | $t_3$= 3.75 |
|   |       |      | $R_6$=+ 37.90 | $s_3$=10.92 |
| 4 | 1.611 | 58.8 | $R_7$=+ 80.09 | $t_4$=11.50 |
|   |       |      | $R_8$=+237.61 | $s_4$= 1.90 |
| 5 | 1.611 | 58.8 | $R_9$=+160.74 | $t_5$=11.50 |
|   |       |      | $R_{10}$=− 86.17 | BF=59.1 |

In this table, as in Figs. 2, 4 and 6, the first column lists the lens elements as numbered from front to rear, the second and third columns give the refractive index N for the D line of the spectrum and the dispersive index V of each element, and the last two columns give the radii of curvature R of the surfaces, the thicknesses $t$ of the elements, and the spaces $s$ between the elements, each numbered by subscripts in order from front to rear. The back focal length BF is also given in the last column. The + and − values of the radii indicate surfaces which are respectively convex and concave to the front.

In this example the fourth element is meniscus in shape and convex to the front, the over-all length of the objective is approximately three-quarters of the focal length, and the best radius of curvature of the face of the cathode ray tube 10 is approximately 3.1 F for projecting onto a flat screen at 5× magnification.

Figs. 3 and 4 show a preferred form of the invention in which the fourth and fifth elements are both biconvex. This objective has a rated speed of f/1.17 and the cone angle subtended at the cathode ray tube is f/1.4. The face of the cathode ray tube is given a radius of curvature of 1.33 F to project an image onto a flat screen at a magnification of five times. The data for this example is given as Example 2, and data for a slight modification thereof is given as Example 3 below.

Example 2.—Figures 3 and 4

[EF=100 mm.   f/1.17]

| Lens | N | V | Radii, mm. | Thicknesses, mm. |
|---|---|---|---|---|
| 1 | 1.611 | 58.8 | $R_1$=+108.30 | $t_1$=14.77 |
|   |       |      | $R_2$=+427.45 | $s_1$= 4.42 |
| 2 | 1.611 | 58.8 | $R_3$=+ 77.32 | $t_2$=14.77 |
|   |       |      | $R_4$=+190.72 | $s_2$=20.79 |
| 3 | 1.647 | 29.4 | $R_5$=−113.99 | $t_3$= 6.42 |
|   |       |      | $R_6$=+ 71.90 | $s_3$= 5.13 |
| 4 | 1.611 | 58.8 | $R_7$=+123.40 | $t_4$=14.12 |
|   |       |      | $R_8$=−123.40 | $s_4$= 9.51 |
| 5 | 1.611 | 58.8 | $R_9$=+116.22 | $t_5$=11.56 |
|   |       |      | $R_{10}$=−211.61 | BF=56.1 |

Example 3.—Figure 3

[EF=100 mm.   f/1.17]

| Lens | N | V | Radii, mm. | Thicknesses, mm. |
|---|---|---|---|---|
| 1 | 1.611 | 58.8 | $R_1$=+106.74 | $t_1$=14.56 |
|   |       |      | $R_2$=+421.33 | $s_1$= 4.35 |
| 2 | 1.611 | 58.8 | $R_3$=+ 76.21 | $t_2$=14.56 |
|   |       |      | $R_4$=+187.99 | $s_2$=20.49 |
| 3 | 1.72  | 29.3 | $R_5$=−129.32 | $t_3$= 6.34 |
|   |       |      | $R_6$=+ 70.67 | $s_3$= 5.06 |
| 4 | 1.611 | 58.8 | $R_7$=+121.63 | $t_4$=13.92 |
|   |       |      | $R_8$=−121.63 | $s_4$=13.92 |
| 5 | 1.611 | 58.8 | $R_9$=+101.41 | $t_5$=11.39 |
|   |       |      | $R_{10}$=−197.63 | BF=55.1 |

In Example 2, the negative element, lens 3, is made of fluosilicate glass of a type shown in U. S. Patent No. 2,481,701, Kuan-Han Sun, issued September 13, 1949. All the other glasses in this example and all glasses used in the other examples are well known commercial types.

When the lens shown as Example 3 was made up and tested, it was found that the image sharpness was more than adequate to reproduce the detail available in a television image and that a still larger aperture would be practicable. Accordingly, Examples 4, 5 and 6 were designed with an aperture of f/1.1. These are slight modifications of Example 3 and are designed to work at five times, six times and 8.6 times magnifications respectively. The data for these examples is as follows:

Example 4.—Figure 3

[EF=100 mm.   f/1.1]

| Lens | N | V | Radii, mm. | Thicknesses, mm. |
|---|---|---|---|---|
| 1 | 1.611 | 58.8 | $R_1$=+107.16 | $t_1$=14.62 |
|   |       |      | $R_2$=+422.98 | $s_1$= 4.37 |
| 2 | 1.611 | 58.8 | $R_3$=+ 76.50 | $t_2$=14.62 |
|   |       |      | $R_4$=+188.73 | $s_2$=20.57 |
| 3 | 1.720 | 29.3 | $R_5$=−135.33 | $t_3$= 6.07 |
|   |       |      | $R_6$=+ 73.48 | $s_3$= 5.08 |
| 4 | 1.611 | 58.8 | $R_7$=+122.11 | $t_4$=13.98 |
|   |       |      | $R_8$=−122.11 | $s_4$=13.98 |
| 5 | 1.611 | 58.8 | $R_9$=+101.16 | $t_5$=11.66 |
|   |       |      | $R_{10}$=−232.03 | BF=53.7 |

Example 5.—Figure 3

[EF=100 mm.   f/1.1]

| Lens | N | V | Radii, mm. | Thicknesses, mm. |
|---|---|---|---|---|
| 1 | 1.611 | 58.8 | $R_1$=+107.53 | $t_1$=14.67 |
|   |       |      | $R_2$=+424.41 | $s_1$= 4.39 |
| 2 | 1.611 | 58.8 | $R_3$=+ 76.77 | $t_2$=14.67 |
|   |       |      | $R_4$=+189.37 | $s_2$=20.64 |
| 3 | 1.720 | 29.3 | $R_5$=−140.54 | $t_3$= 6.68 |
|   |       |      | $R_6$=+ 76.77 | $s_3$= 5.10 |
| 4 | 1.611 | 58.8 | $R_7$=+122.52 | $t_4$=14.02 |
|   |       |      | $R_8$=−122.52 | $s_4$=14.02 |
| 5 | 1.611 | 58.8 | $R_9$=+ 91.99 | $t_5$=12.40 |
|   |       |      | $R_{10}$=−408.94 | BF=36.8 |

Example 6.—Figure 3

[EF=100 mm.   f/1.1]

| Lens | N | V | Radii, mm. | Thicknesses, mm. |
|---|---|---|---|---|
| 1 | 1.611 | 58.8 | $R_1$=+107.20 | $t_1$=14.62 |
|   |       |      | $R_2$=+423.12 | $s_1$= 4.37 |
| 2 | 1.611 | 58.8 | $R_3$=+ 76.33 | $t_2$=14.62 |
|   |       |      | $R_4$=+188.79 | $s_2$=20.58 |
| 3 | 1.720 | 29.3 | $R_5$=−139.39 | $t_3$= 7.02 |
|   |       |      | $R_6$=+ 76.08 | $s_3$= 5.08 |
| 4 | 1.611 | 58.8 | $R_7$=+122.15 | $t_4$=13.98 |
|   |       |      | $R_8$=−122.15 | $s_4$=13.98 |
| 5 | 1.611 | 58.8 | $R_9$=+ 97.79 | $t_5$=11.44 |
|   |       |      | $R_{10}$=−310.28 | BF=49.5 |

The over-all length of each of these examples is about 1.07 F. The best radius of curvature for the face of the tube is 1.39 F for Example 4, 1.27 F for Example 5 and 1.66 F for Example 6 when used at the magnifications stated above.

Figs. 5 and 6 show a modification of the invention in which the third air space is decreased so that the third and fourth elements are mounted in marginal contact. This simplifies the mounting of the objective. Otherwise this example is similar to Example 5. The data for this example is given as Example 7 below. The radius of curvature of the face of the cathode ray tube should be about 1.32 F in this case.

*Example 7.—Figures 5 and 6*

[EF=100 mm.    f/1.1]

| Lens | N | V | Radii, mm. | Thicknesses, mm. |
|---|---|---|---|---|
| 1 | 1.611 | 58.8 | $R_1=+107.83$<br>$R_2=+425.63$ | $t_1=14.71$<br>$s_1=4.40$ |
| 2 | 1.611 | 58.8 | $R_3=+76.99$<br>$R_4=+189.91$ | $t_2=14.71$<br>$s_2=20.70$ |
| 3 | 1.720 | 29.3 | $R_5=-124.04$<br>$R_6=+73.44$ | $t_3=6.85$<br>$s_3=2.93$ |
| 4 | 1.611 | 58.8 | $R_7=+122.87$<br>$R_8=-122.87$ | $t_4=14.06$<br>$s_4=12.47$ |
| 5 | 1.611 | 58.8 | $R_9=+104.87$<br>$R_{10}=-179.75$ | $t_5=12.79$<br>BF=55.2 |

In Example 1, the focal lengths of the individual elements are approximately 1.5 F, 1.4 F, −0.48 F, 1.9 F and 1.1 F respectively from front to rear, and the sum of the powers of the surfaces of the four positive elements is approximately 2.9/F. The preferred Examples 2 to 7 are all nearly alike in respect to the powers of the elements. In Example 5, which is typical, the local lengths of the elements are 2.3 F, 2.0 F, −0.67 F, 1.0 F and 1.2 F respectively from front to rear, and the sum of the powers of the surfaces of the positive elements is approximately 2.7/F.

In all of the preferred examples shown, the radii of curvature R and the refractive indices N are within the preferred ranges set forth in the following table of algebraic inequalities:

$$0.8\ F < +R_1 < 1.3\ F$$
$$3\ F < +R_2 \leq \infty$$
$$0.6\ F < +R_3 < F$$
$$1.4\ F < +R_4 < 2.4\ F$$
$$F < -R_5 < 1.6\ F$$
$$0.5\ F < +R_6 < 0.9\ F$$
$$0.9\ F < +R_7 < 1.5\ F$$
$$F < -R_8 < 1.7\ F$$
$$0.7\ F < +R_9 < 1.4\ F$$
$$F < -R_{10} < 6\ F$$
$$1.60 < N_p < 1.64$$
$$1.64 < N_n < 1.75$$

where $N_p$ is the refractive index of each positive element taken separately and $N_n$ is the refractive index of the negative element.

The axial thickness of each positive element is conveniently between 0.1 F and 0.2 F, and that of the negative element is conveniently between 0.05 F and 0.15 F. Each space between adjacent elements is conveniently between 0.01 F and 0.25 F.

By means of the above described features of the invention and particularly by the specific curvatures of the preferred form of the invention, I have produced objectives with the very high apertures shown whereby a very bright television image is projected, and the over-all quality of the image is more than sufficient to reproduce the detail available on the television tube.

Figs. 7 and 8 show a further development of the invention in which Example 6 has been adapted for use with a field flattener by adjusting the curvatures of the surfaces to compensate for the slight change in focal length and aberrations caused by the field flattener.

This system is useful with plane-faced cathode ray tubes and is also useful for photographing X-ray fluorescent screens on a reduced scale. It is designed for use at a magnification of 7.7 times. The data, given for a focal length of 100 mm. for the whole system, is given as Example 8 below:

*Example 8.—Figs. 7 and 8*

| Lens | N | V | Radii, mm. | Thicknesses, mm. |
|---|---|---|---|---|
| 1 | 1.611 | 58.8 | $R_1=+110.62$<br>$R_2=+436.64$ | $t_1=15.09$<br>$s_1=4.51$ |
| 2 | 1.611 | 58.8 | $R_3=+78.98$<br>$R_4=+194.82$ | $t_2=15.09$<br>$s_2=21.24$ |
| 3 | 1.720 | 29.3 | $R_5=-140.39$<br>$R_6=+84.21$ | $t_3=7.51$<br>$s_3=5.24$ |
| 4 | 1.611 | 58.8 | $R_7=+105.10$<br>$R_8=-164.57$ | $t_4=14.43$<br>$s_4=14.43$ |
| 5 | 1.611 | 58.8 | $R_7=+108.85$<br>$R_{10}=-269.31$ | $t_5=11.81$<br>$s_5=46.56$ |
| 6 | 1.517 | 64.5 | $R_{11}=-47.50$<br>$R_{12}=\infty$ | $t_6=5.63$ |

The focal length of the objective member of the system, that is the first five elements as a group, is 103.0 mm. The negative field lens, being beyond the principal focal point, shortens the focal length rather than lengthening it. It will be noted that the several radii of curvature, taken relative to this last mentioned focal length, are within the respective preferred ranges previously set forth.

What I claim is:

1. An optical objective for projecting the image from a concave face of a cathode ray tube at a finite magnification comprising five simple air-spaced lens elements of which the front element facing the longer conjugate is positive, has its front surface more strongly curved than its rear surface, and has a focal length between 1.25 F and 3.5 F where F is the focal length of the objective; the second element is a positive meniscus, has a convex front surface, the radius of curvature of which is between 0.4 F and F, and has a focal length between 1.25 F and 3.5 F; the middle element is biconcave, has its more strongly curved surface to the rear, has a dispersive index between 0.4 and 0.6 times as great as the average of the dispersive indices of the other four elements, and has a focal length between −0.4 F and −0.8 F, the fourth element is positive, has a convex front surface, the radius of curvature of which is between 0.5 F and 2 F, and has a focal length between 0.8 F and 2.5 F, and the rear element is biconvex and has a focal length between 0.65 F and 1.65 F, and in which the second air space is the largest of the four air spaces, the over-all length from the front surface of the front element to the rear surface of the rear element is between 0.7 F and 1.3 F, and each refractive index is between 1.56 and 1.80.

2. An objective according to claim 1 in which the algebraic sum of the powers of the eight surfaces of the four positive elements is between 2.5/F and 3.1/F.

3. An optical objective according to claim 2 comprising five simple axially separated elements and corrected for spherical aberration, coma, and astigmatism, in which the radii of curvature R, numbered by subscripts from front to rear are within the limits set forth by the following algebraic inequalities:

$$0.8\ F < +R_1 < 1.3\ F$$
$$3\ F < +R_2 \leqslant \infty$$
$$0.6\ F < +R_3 < F$$
$$1.4\ F < +R_4 < 2.4\ F$$
$$F < -R_5 < 1.6\ F$$
$$0.5\ F < +R_6 < 0.9\ F$$
$$0.9\ F < +R_7 < 1.5\ F$$
$$F < -R_8 < 1.7\ F$$
$$0.7\ F < +R_9 < 1.4\ F$$
$$F < -R_{10} < 6\ F$$

where F is the focal length of the objective and the + and − values of the radii denote surfaces respectively convex and concave to the front, and in which the thickness of each positive element is between 0.1 F and 0.2 F, that of the negative element is between 0.05 F and 0.15 F, each space between adjacent elements is between 0.01 F and 0.25 F, the refractive index of each positive element is between 1.60 and 1.64, and that of the negative element is between 1.64 and 1.75.

WILLY SCHADE.

REFERENCES CITED

The following references are of record in the file of this patent:

UNITED STATES PATENTS

| Number | Name | Date |
|---|---|---|
| 1,839,011 | Bielicke | Dec. 29, 1931 |
| 2,348,667 | Warmisham | May 9, 1944 |

FOREIGN PATENTS

| Number | Country | Date |
|---|---|---|
| 127,058 | Great Britain | May 29, 1919 |
| 186,917 | Great Britain | Mar. 8, 1923 |